Sept. 8, 1959     E. P. NEHER ET AL     2,903,228

VIBRATION ISOLATOR MOUNTING

Filed Sept. 24, 1956

INVENTORS
Howard J. Peppercorn
Eldon P. Neher
BY McCoy, Greene + te Grotenhuis
ATTORNEYS United States Patent Office 2,903,228
Patented Sept. 8, 1959

2,903,228

VIBRATION ISOLATOR MOUNTING

Eldon Paul Neher and Howard J. Peppercorn, Logansport, Ind., assignors to The General Tire & Rubber Company, Akron, Ohio, a corporation of Ohio Application September 24, 1956, Serial No. 611,549

2 Claims. (Cl. 248—358)

This invention relates to a vibration isolator mounting for aircraft instruments which is particularly adapted to low temperature operating conditions.

Instruments which are used to navigate aircraft must be free of vibration in order to function effectively. Ordinary vibration mountings are effective in curbing deflections which are caused by forces exerted in only one plane or direction. However, in aircraft instruments the mounting must be effective against vibration forces exerted in all planes. The mountings presently in use employ various arrangements of rubber bushings as the vibration isolating medium. At low temperatures, however, the rubber stiffens and the mounting does not function properly.

The object of the present invention is to provide an aircraft instrument mounting which curbs deflections caused by forces acting in any plane under all temperature conditions and particularly under low temperature conditions.

Figure 1:
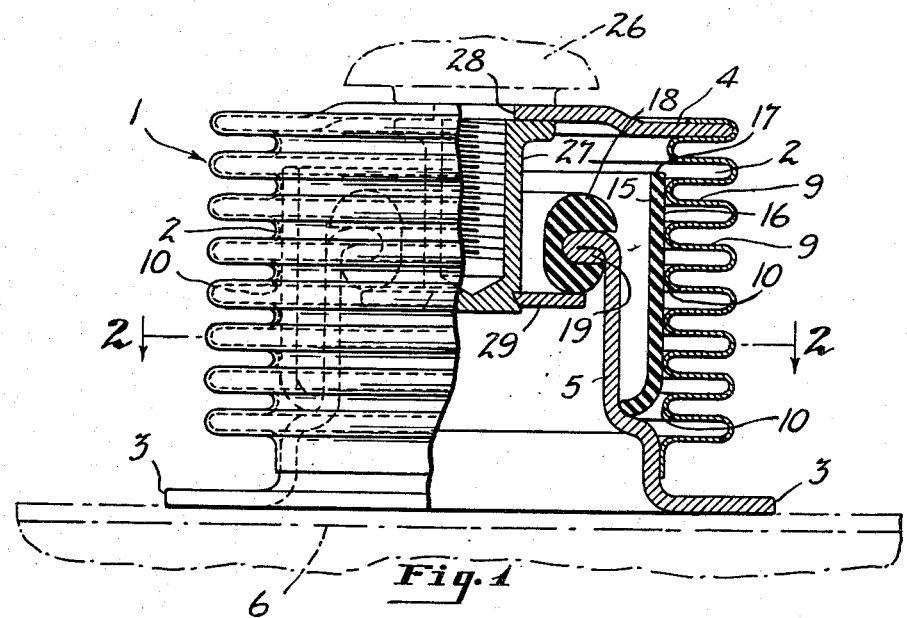
Figure 2:
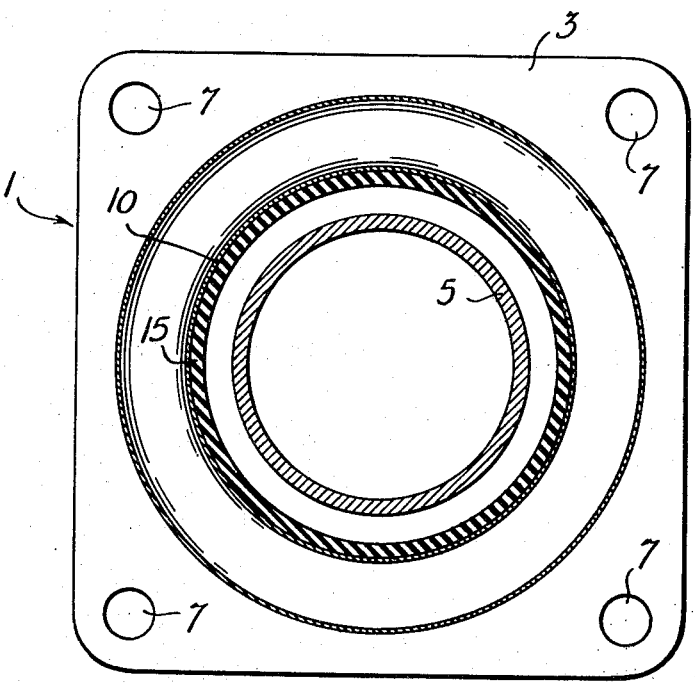

Other objects, uses and advantages of the present invention will become apparent from the following description and claims and from the drawings, in which:

Figure 1 is a fragmentary elevational view of a vibration isolator unit embodying the present invention, with parts broken away and shown in cross section; and Figure 2 is a top sectional view taken on the line indicated at 2—2 in Fig. 1.

The present invention comprises a vibration isolator mounting 1 provided with a base plate 3 and an instrument mounting plate 4 separated by metallic bellows 2. A generally cylindrical rubber sleeve 15 is disposed inwardly of the folds of the bellows and is substantially coextensive therewith.

The base plate is provided with an upper cylindrical portion 5 extending inside of the bellows and rubber sleeve. Said cylindrical portion 5 in turn has inwardly directed, substantially lateral flange portions 19 upon which is mounted a rubber bumper 18. The base plate is mounted on the instrument panel 6 by bolts or other fastening means which fit in holes 7.

The instrument mounting plate is circular in plan view and substantially laterally coextensive with the bellows, the top of the bellows being attached to the edge of the instrument mounting plate. A core member 27 is mounted on the mounting plate and extends downward inside of the bellows, rubber sleeve, and rubber bumper 18. The base of the core member is provided with a laterally extending bumper plate 29, said bumper plate being substantially parallel to the instrument plate 4.

A screw member 26 (shown in dotted outline) is adapted to interfit with the instrument being isolated by the mounting and screw into the inside threaded portion of the core member. The core member is cylindrical in shape with a hollow, threaded interior. It is welded or otherwise attached to the instrument mounting plate 4. At the other end of the core member is bumper plate 29 having greater lateral dimensions than the core and a greater outer diameter than the inner diameter of the rubber bumper 18. The normal position of plate 29 is resting against the rubber bumper in slight compression from the bellows so as to steady the unit. With downward deflections, it moves down away from the bumper and with upward deflections it engages the bumper, as is apparent from Fig. 1.

The metal bellows may be copper, bronze or any other suitable vibration absorbing metal or alloy. The metal used must have a high resistance to repeated flexing and a certain amount of springiness, but otherwise there are no material limitations. The metal bellows has a generally circular cross sectional area and a plurality of folds 9 provided with inner peripheral edges 10. The rubber sleeve 15 is disposed inwardly of the folds 9 and preferably maintains contact with them, as shown in Fig. 1.

The rubber sleeve 15 does not contact the instrument mounting plate under normal operating conditions. When forces tending to cause abnormal deflection are encountered, damping action is provided by the frictional contact between the outer surface 16 of the rubber sleeve 15 and the inner edges 10 of the folds 9 of the bellows and by air pressure differential control as the air inside the bellows and folds of the bellows resists compression.

Under large compressional forces and resultant large deflection, the instrument plate may contact the top portion 17 of the rubber sleeve to thereby provide a curbing effect in addition to the frictional contact of the bellow-folds and the rubber sleeve and the air pressure differential set up as air is entrapped in the folds during compression of the bellows. Under very large compressional forces which result in very large deflections, downward deflection is limited by rubber bumper 18 which engages the bottom portion of the instrument plate.

A deflection caused by a force at an angle other than normal to the lateral axis of the mounting plate is effectively arrested by the damping action of the bellows and rubber sleeve. The rubber sleeve is located and shaped so that it resists and minimizes horizontal movements of the instrument mounting plate with respect to the base plate.

Supplemental damping action is provided by a combination of frictional contact between the rubber sleeve and the folds of the metal bellows as they work and by the air cushioning effect arising from air pressure differences from the movement of air between the outer fold portions of the bellows and the interior portions by the rubber sleeve. The major damping action is of course provided by the bellows themselves.

A satisfactory damping action is thus obtained not only against forces of varied degrees but also against forces from varied angles. Furthermore, the mounting is not affected by low temperatures.

While it is preferable to have the mounting unit with a circular cross sectional shape as shown, it is possible to adapt the unit to other cross-sectional shapes such as a square shape. When this is done, the shape of the bellows, rubber sleeve and other elements must be altered as necessary.

It is to be understood that in accordance with the provisions of the patent statutes, various modifications of our invention may be made without departing from the spirit thereof.

Having thus described our invention, we claim:

1. A vibration isolator mount for instruments comprising metal bellows, an instrument mounting plate joined to one end of said bellows, a central core extending inside of said bellows attached to said instrument mounting plate, a bumper plate spaced from said instrument mounting plate and attached to said central core and having greater lateral dimensions than said core, a base plate attached to the other end of said bellows provided with a cylindrical flanged portion extending inside of said bellows and outside of said core, the flanges of said cylindrical flanged portion being substantially parallel with said bumper plate, a rubber sleeve engaging the inner folds of said bellows and extending upward from the base plate to a point below said instrument mounting plate in the normal load position, and a rubber bumper mounted on the flanges of said cylindrical flanged portion defining a central cavity surrounding said central core, said bumper engaging said bumper plate and instrument mounting plate at excessive vibrations, but not simultaneously.

2. A vibration isolator mount for instruments comprising metal bellows, an instrument mounting plate joined to one end of said bellows, a central core extending inside of said bellows attached to said instrument mounting plate, a bumper plate spaced from said instrument mounting plate and attached to said central core and having greater lateral dimensions than said core, a base plate attached to the other end of said bellows and provided with a cylindrical member attached to said base plate extending inside of said bellows provided with flanged portions substantially parallel to said bumper plate embracing the central portion of said core intermediate said instrument mounting plate and said base plate, a rubber sleeve engaging the inner folds of said bellows extending upward from the base plate to a point below said instrument mounting plate in the normal load position, and an annular rubber bumper mounted on said cylindrical member intermediate said bumper plate and instrument mounting plate, so as to engage said bumper plate and mounting plate at excessive vibrations.

References Cited in the file of this patent

UNITED STATES PATENTS

| | | |
|---|---|---|
| 1,994,885 | De Florez | Mar. 19, 1935 |
| 2,359,915 | Hussman | Oct. 10, 1944 |
| 2,519,702 | Robinson | Aug. 22, 1950 |
| 2,520,442 | Schwartz | Aug. 29, 1950 |